Jan. 7, 1958   O. H. JORGENSEN   2,818,751
STEPLESSLY VARIABLE RATIO POWER TRANSMISSION GEAR
Filed July 20, 1955
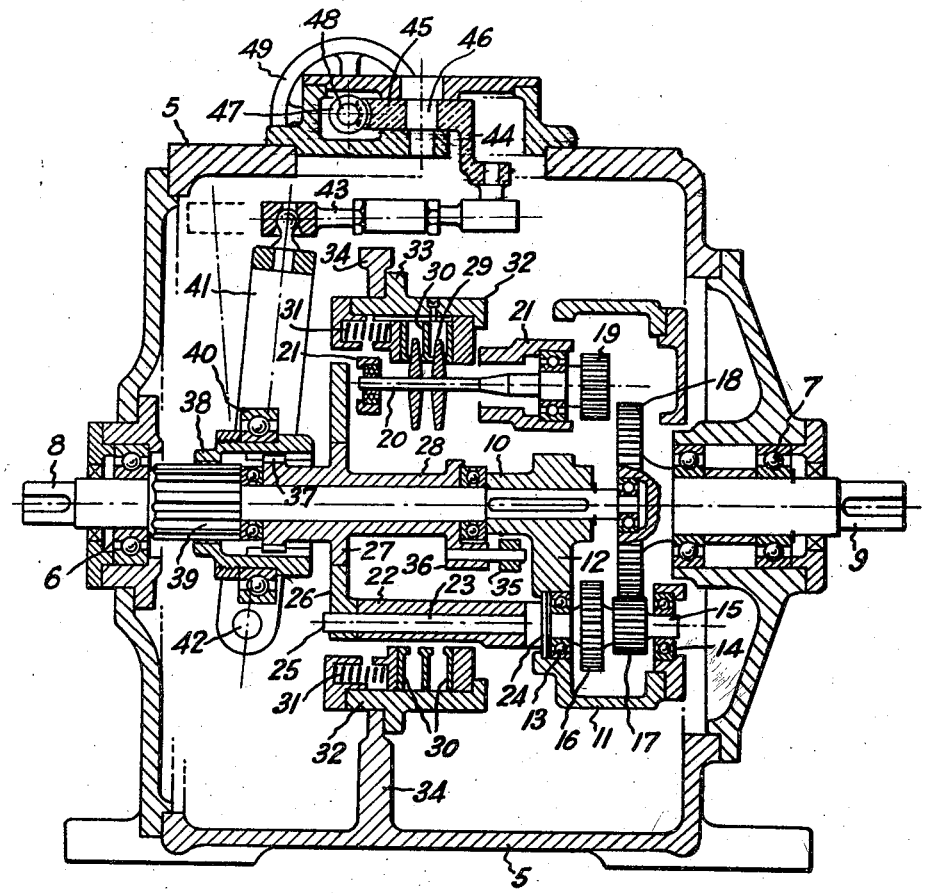
INVENTOR
OSCAR HALFDAN JORGENSEN
by Mead, Browne, Schuyler & Beveridge
ATTORNEYS

United States Patent Office 2,818,751
Patented Jan. 7, 1958

2,818,751

STEPLESSLY VARIABLE RATIO POWER TRANSMISSION GEAR

Oscar Halfdan Jorgensen, St. Ives, New South Wales, Australia

Application July 20, 1955, Serial No. 523,241

Claims priority, application Australia July 28, 1954

4 Claims. (Cl. 74—690)

This invention is related to power transmission devices of the class exemplified by that subject of my prior Australian Patent No. 149,678.

The transmission gear subject of the said prior patent is highly efficient over the full range of drive ratio variations within its compass; but, by reference to the embodiment of the invention disclosed by the drawings in the specification belonging to the said prior patent, it will be seen that the lower or "low gear" end of the gear ratio range has a definite limit which obtains when the inner peripheries of the annular rings 28 (still referring to the mentioned drawings) touch, or almost touch, the splined shafts 21.

Commercialisation of the said prior invention has disclosed need for a similarly operating type of steplessly variable ratio power transmission gear which will provide for a range of ratios extending below the lower limit ratio obtainable, in practice, in any feasible embodiment of the said prior invention.

The object of this invention is to meet the stated need in a simple manner, by the provision of a power transmission gear of the class indicated, which provides for a gear ratio range which, for example, may extend down to and through or negatively beyond zero revolutions of the output or driven shaft. That is to say, a range which (with uniform or variable unidirectional rotation of the input or driving shaft) may include zero speed of the output shaft and may extend positively and negatively (by reversed rotation of the driven shaft) on either side of the zero point.

The invention subject hereof is intended for use where the rate at which the output shaft turns is a major consideration, as is the case in the drives for very many different kinds of industrial machinery and the like. By the invention a given gear ratio may be selected, established, maintained or varied, either manually or automatically entirely or primarily with regard to the rate of rotation required of the output shaft.

An example of the invention is illustrated as a medial cross-sectional elevation in the single figure of drawing herewith. This drawing is, to some extent, schematic and certain parts are omitted, for simplicity, because such parts are already well known by virtue of them having been disclosed in the specification of the mentioned prior patent.

The drawing illustrates a medial cross sectional elevational view of a power transmission gear according to an embodiment of the present invention.

The gear change mechanism is housed in a gear box casing 5, of more or less conventional design, having bearings 6 and 7 in its ends for coaxial input and output shafts 8 and 9. The input shaft has the centre boss or hub 10 of a lantern carrier fixedly keyed thereon. This carrier consists of a roughly cylindrical shell 11 which is spaced from and concentrically surrounds the boss or hub 10, being joined thereto by a number of arms or spokes 12 so that the whole carrier revolves at one with the input shaft 8. The lantern carrier has bearings 13 and 14 thereon for two or more planetary shafts 15 which or each of which carries an idler gear (referred to below). The planetary shafts have their axes parallel to but spaced from the common axis of the input and output shafts. The number of planetary shafts may be two in number or more than three, but three is the preferred number, and in the description which follows the given examples of the invention will be referred to as having the planetary shafts and the parts associated therewith present on this triple basis.

The mentioned idler gears each consist of two coaxial gear parts 16 and 17 of the same or different diameter, integrally or otherwise fixedly joined together. The second gear parts 17 of each of the three idler gears all mesh with a common driven sun gear 18 keyed upon the output shaft 9. The first gear parts 16 of the idler gears respectively mesh with three driver or satellite gears 19 respectively keyed on three splined shafts 20 freely revolubly borne in the outer ends 21 of three swing brackets pivotally mounted by their inner ends 22 on the lantern carrier about axes which are coincident with those of the idler gears. The swing bracket inner ends 22 are preferably mounted on the carrier by way of pins 23 supported directly on the carrier at one end 24 and at the other end 25 supported in a support ring 26 forming part of the lantern carrier 11 and freely revolubly mounted on a flange 27 forming part of a control sleeve 28 referred to later herein.

The splined shafts 20 are substantially the same as those marked 21 in the said prior drawings and each similarly carries a number of coned discs 29 similar to those marked 26 in those earlier drawings. These discs engage between the individual annular rings 30 of a stack thereof which, again, is similar to that shown in the prior drawings; and in further similarity this stack is furnished with hydraulic loading means or compression springs 31, and is carried in a yoke ring 32 substantially the same as that in the mentioned prior drawings.

The drive train consisting of the lantern carrier 11 (keyed on the input shaft 8), the idler gears 16—17 and the sun gear 18 keyed on the output shaft 9, constitute an epicyclic train through which (assuming the output shaft has some load thereon) no drive will be transmitted unless the annular ring stack 30 is restrained against rotation. This restraint is established by fixedly mounting the yoke ring 32 within the gear box casing; for example, by bolting through ring flange 33 into casing flange 34.

It will be appreciated that effective drive can only take place by imposing a restraining force upon the gears 19 which prevents them from rotating with absolute freedom about their own axes. This restraining or braking force is applied to the satellite gears by reason of the discs 29 being sandwiched between the annuli 30 and the endwise loading applied to the annuli by the springs 31. It will be further seen that the braking effect applied to the gears 19, and hence their speed of rotation about their own axes will vary in accordance with the amount by which the discs 29 are penetrated between the annuli 30; and this, in turn by varying the rotational speed of the idler gears 16—17 about their own axes will vary the speed at which the sun wheel 18 rotates.

By suitable design of the tooth ratios between gears 16, 17, 18 and 19, any point in the radial movement range of the discs 29, may be selected as a zero drive point in which, notwithstanding the yoke ring 32 being held stationary, no torque will be transmitted to the output shaft 9 because at the zero drive point the idler gears 16—17 will simply run round the sun gear 18 without turning it. Under these circumstances any radial movement of the discs 29 on either side of the zero position will turn the output shaft either positively or negatively, and the rate of that turning will be directly proportional to the amount by which the discs 29 have been radially displaced from their zero point position. In this connection it will be appreciated that for some installations the ratio range will not be required to include a portion on the negative side of a zero point, and in others an actual zero point will not be required. In others, output speeds down to zero R. P. M. may be required but reverse or negative drive unwanted. In such a case the ratio range may extend negatively just beyond the zero point (thus to ensure certain arrival at that point when required) and a unidirectional clutch may be associated with the output shaft so that zero point can be reached while safeguarding against possibility of that point being negatively exceeded insofar as the final output application of the drive is concerned.

Means for imposing and maintaining or selectively varying the required amount of cone disc penetration automatically or at the will of the user and independently of centrifugal considerations, may take several forms. In the preferred form illustrated each of the swing brackets 21—22 has a link 35 pivotally connected thereto by one of its ends. The other ends of these three links are pivotally connected to a three-throw crank plate 36 integral with or fixed upon the control sleeve 28 which is freely revolubly mounted centrally of the unit. The arrangement is substantially the same as that illustrated in Fig. 3 of the drawings belonging to the mentioned prior patent. This control sleeve is restrained against endwise movement, and at one of its ends (for preference) it is furnished with mechanism whereby it may be turned and held in selected rotational adjustment. This mechanism may consist of a ring of helical gear teeth 37 on the control sleeve able to screw within a female counterpart thread in a thrust sleeve 38 splinedly mounted (at 39) on the input shaft 8 so that it rotates at one therewith but is endwisely movable therealong. The thrust sleeve is mounted in a bearing 40 which is trunnion mounted on a striking lever 41 fulcrumed at 42 on a stationary part of the gear box. Lever 41 is connected by a pitman 43 to a crank arm 44 on a worm wheel 45. This worm wheel is borne on pin 46 and meshes pinion 47 on a control shaft 48 in bearings in the casing, and externally of the casing having a handwheel 49 thereon.

It will be understood that although the control shaft 48 is said to have a handwheel thereon which would, of course, be turned manually for variation of gear ratios; said control shaft may be automatically turned by relay or governor devices responsive, in conventional manner, to any variable factors arising independently of or within the mechanism operated by the output shaft.

In the illustrated embodiment of the invention each of the cone disc groups is shown to consist of only two discs. Obviously this number may be greater than two, and in some relatively lightly loaded units may be as small as one; provided, of course, that the number of annular rings is correspondingly varied.

I claim:

1. Steplessly variable-speed power transmission devices comprising, an input shaft, a lantern carrier keyed on said input shaft, a plurality of planetary idler gears freely revolubly mounted on said carrier about axes parallel with and equally spaced from the axis of said input shaft and from each other, a sun-wheel mounted coaxially relatively to said input shaft and meshed by said idler gears, an output shaft whereon said sun-wheel is fixedly mounted, swing brackets equal in number to and respectively associated with said idler gears and each pivotally mounted by its inner end about the axis of its idler gear, spline shafts equal in number to and respectively borne in the outer ends of said swing brackets, satellite gears respectively keyed on said spline shafts and meshing said idler gears, coned discs keyed on said spline shafts, a stack of annular rings between which said discs engage from inside said rings, a stationary yoke ring within which said rings are keyed, and spring means for applying an axially directed loading to said stack.

2. Devices according to claim 1 which incorporate mechanism for enforcing a selected adjustment of said discs relative to said rings.

3. Devices according to claim 2 wherein said mechanism comprises, links equal in number to said swing brackets and each pivotally connected by one end to one of said brackets, a crank plate to which said links are pivotally connected by their other ends, a control sleeve whereon said crank plate is fixed and which is freely revolubly mounted about the axis of said input shaft, and means for rotating said control sleeve.

4. Devices according to claim 3 wherein said means for rotating said control sleeve comprise, a ring of helical gear teeth on said control sleeve, a thrust sleeve splinedly mounted on said input shaft and having a female counterpart for said teeth engaged therewith, a striking lever mounted by one end about a stationary fulcrum and within which said thrust sleeve is trunnion mounted, and pitman and crank means for moving said striking lever about its fulcrum.

References Cited in the file of this patent

UNITED STATES PATENTS

| 1,770,408 | Jacobson | July 15, 1930 |
| 2,478,227 | Bannister | Aug. 9, 1949 |

FOREIGN PATENTS

| 603,224 | Germany | Oct. 2, 1954 |
| 713,820 | Great Britain | Aug. 18, 1954 |
| 1,060,957 | France | Nov. 23, 1953 |